(12) United States Patent
Petitjean (10) Patent No.: US 9,046,036 B2
(45) Date of Patent: Jun. 2, 2015

(54) BEARING ASSEMBLY (75) Inventor: Dominique Petitjean, Julienrupt (FR)

(73) Assignee: Honeywell International Inc., Morristown, NJ (US)

( * ) Notice: Subject to any disclaimer, the term of this patent is extended or adjusted under 35 U.S.C. 154(b) by 856 days.

(21) Appl. No.: 13/149,439

(22) Filed: May 31, 2011

(65) Prior Publication Data

US 2012/0308366 A1 Dec. 6, 2012

(51) Int. Cl.
*F16C 23/06* (2006.01)
*F16C 33/66* (2006.01)
*F16C 37/00* (2006.01)
*F16C 33/10* (2006.01)
*F01D 25/16* (2006.01)
*F02C 6/12* (2006.01)
*F01D 25/18* (2006.01)
*F16C 21/00* (2006.01)

(52) U.S. Cl.
CPC . *F02C 6/12* (2013.01); *F01D 25/16* (2013.01); *F01D 25/18* (2013.01); *F05D 2220/40* (2013.01); *F16C 21/00* (2013.01)

(58) Field of Classification Search
USPC ........... 384/99, 101, 126, 129, 286, 397, 513, 384/585–587, 606, 490, 906; 60/600, 602, 60/607–608; 415/111–112, 148, 150, 229, 415/407, 411–412, 170.1; 417/406–407, 417/423; 184/6, 611
See application file for complete search history.

(56) References Cited

U.S. PATENT DOCUMENTS

| | | | |
|---|---|---|---|
| 3,411,706 A * | 11/1968 | Woollenweber, Jr. et al. ............................ | 417/407 |
| 3,890,780 A * | 6/1975 | Hagemeister et al. ......... | 417/407 |
| 4,091,663 A * | 5/1978 | Lagasse et al. ............ | 73/862.31 |
| 4,641,977 A * | 2/1987 | Woollenweber ................ | 384/99 |
| 5,025,629 A * | 6/1991 | Woollenweber ................ | 60/602 |
| 5,094,587 A * | 3/1992 | Woollenweber .............. | 415/205 |
| 5,522,667 A | 6/1996 | Miyake | |
| 5,870,894 A * | 2/1999 | Woollenweber et al. ........ | 60/607 |
| 5,890,881 A * | 4/1999 | Adeff ............................ | 415/111 |
| 5,967,762 A * | 10/1999 | Keller et al. ................... | 417/407 |
| 6,032,466 A * | 3/2000 | Woollenweber et al. ........ | 60/607 |
| 6,220,829 B1 * | 4/2001 | Thompson et al. ............. | 384/99 |
| 7,104,693 B2 * | 9/2006 | Mavrosakis .................... | 384/99 |

\* cited by examiner

*Primary Examiner* — Marcus Charles
(74) *Attorney, Agent, or Firm* — Brian J. Pangrle (57) ABSTRACT

A turbocharger bearing cartridge can include a bearing with an inner race, an outer race and rolling elements disposed between the inner race and the outer race; a journal bearing; and a shell that includes an interior, compressor side annular surface configured to seat the outer race of the bearing and an interior, turbine side annular surface configured to seat the journal bearing.

20 Claims, 8 Drawing Sheets

Fig. 8

BEARING ASSEMBLY

TECHNICAL FIELD

Subject matter disclosed herein relates generally to turbomachinery for internal combustion engines and, in particular, to bearing assemblies.

BACKGROUND

Turbocharger bearings must operate at elevated temperatures and significant shaft speeds. For example, a gasoline powered internal combustion engine may generate exhaust having a temperature in excess of 1000 degrees Celsius to propel a turbine to a shaft speed in excess of 100,000 revolutions per minute, where bearing friction losses can generates significant heat. Adequate lubricant and lubricant flow is important to extract heat and lubricate bearing or bearing and shaft surfaces. Lubricant may also provide for film formation that can float a bearing, for example, for purposes of damping vibrations caused by shaft, bearing or lubricant dynamics. As described herein, various components, assemblies, methods, etc., may provide for enhanced turbocharger bearing assembly, performance, longevity, etc., optionally at reduced cost.

SUMMARY

A turbocharger bearing cartridge can include a bearing with an inner race, an outer race and rolling elements disposed between the inner race and the outer race; a journal bearing; and a shell that includes an interior, compressor side annular surface configured to seat the outer race of the bearing and an interior, turbine side annular surface configured to seat the journal bearing.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Various turbocharger bearing assemblies are described herein. For example, a turbocharger bearing cartridge assembly can include a bearing with an inner race, an outer race and rolling elements disposed between the inner race and the outer race; a journal bearing; and a shell that includes an interior, compressor side annular surface configured to seat the outer race of the bearing and an interior, turbine side annular surface configured to seat the journal bearing.

As described herein, a bearing assembly is typically configured for insertion in a bore of a housing of a turbocharger. As an example, consider a turbocharger assembly that includes a shell configured to seat a compressor side rolling element bearing and a turbine side journal bearing where the shell includes a compressor side rim and an anti-rotation feature; and a housing that includes a bore configured to receive the shell, an axial face configured to seat the rim of the shell to axially locate the shell in the bore, and an anti-rotation feature configured to cooperate with the anti-rotation feature of the shell to limit rotation of the shell in the bore. In such an example, clearances between the shell and the housing can provide for formation of lubricant films to float the shell in the housing.

As another example, consider a turbocharger assembly that includes a bearing cartridge with a rimmed shell seating a compressor side rolling element bearing and a turbine side journal bearing; a housing with an axial face and a bore configured to, respectively, axially located and receive the rimmed shell; and a shaft rotatably supported by the rolling element bearing where the shaft includes a finned portion for enhanced heat transfer. In the foregoing example, the rimmed shell includes a rim and a shell body that extends axially away from the rim that seats the compressor side rolling element bearing and the turbine side journal bearing. During operation, the finned portion of the shaft acts to increase heat transfer between the shaft and lubricant (e.g., at least in part via increased heat transfer area) and reduce temperatures experienced by the compressor side rolling element bearing. Again, for most turbochargers, exhaust is the main source of heat. By positioning a rolling element bearing at a distance from an exhaust turbine and increasing shaft-to-lubricant heat transfer at a location between the rolling element bearing and the exhaust turbine, the operational environment of the rolling element bearing can be made more favorable, optionally allowing for a lower cost rolling element bearing when compared to conventional arrangements.

As described herein, various components, assemblies, methods, etc., can facilitate turbocharger manufacture, enhance turbocharger performance, increase bearing longevity, etc. In various examples, a shell is configured to seat a rolling element bearing and a journal bearing and to float in a housing on lubricant squeeze films formed between the shell and housing (e.g., in comparison to conventional approaches that rely on an outer race-housing squeeze film). An approach that includes shell-housing squeeze films can reduce angular axial shaft tilt, which, in turn, can improve bearing durability. For example, a conventional assembly may have a tilt of about 0.25 degrees whereas, as an example, a shell approach may reduce tilt to about 0.06 degrees (e.g., a reduction of about one-fourth to one-fifth compared to a conventional assembly, which may be achieved by maximum tilt being determined primarily by inside radial clearance of a journal bearing). Such an approach can be beneficial as high tilt conditions may be detrimental for tracks of a rolling element bearing (e.g., ball tracks of a ball bearing). Further, through features to enhance lubricant flow, heat transfer or combinations thereof, a compressor side bearing may be able to operate at lower temperatures to reduce thermal stress, reduce risk of coke formation, etc.

As to various examples that include a rolling element bearing and a journal bearing, such an approach can optionally eliminate a need for a thrust bearing while benefiting from low power loss/high load capacity of a rolling element bearing (e.g., ball or other type of rolling element), without jeopardizing reliability due to high turbine side temperatures. Specifically, a shell approach can allow for locating a compressor side bearing as far as it can reasonably be from a turbine side exhaust heat source. With a reduction in exhaust heat transfer to a compressor side bearing (e.g., optionally with enhanced cooling), high cost rolling element bearing race materials, such as M50 VIM-VAR steel (a through-hardening grade with high hardness and high compressive strength at elevated temperatures), may reasonably be avoided.

As to improved cooling, as an example, a shaft may be machined or otherwise formed with features that improve heat transfer from the shaft to a cooling fluid (e.g., lubricant). Consider a shaft machined with finned profiles between bearing areas and an optional housing-shell lubricant jet cooling directed to finned region of the shaft. As described herein, where jet cooling is provided, jet opening or passage restrictions (e.g., length, cross-sectional area, shape, etc.) may be fine tuned to manage overall lubricant flow, particularly to provide for adequate bearing lubrication and intermediate shaft cooling while avoiding any excessive increase in overall lubricant flow through a turbocharger (e.g., which may increase power loss).

Below, an example of a turbocharged engine system is described followed by various examples of components, assemblies, methods, etc.

Figure 1:
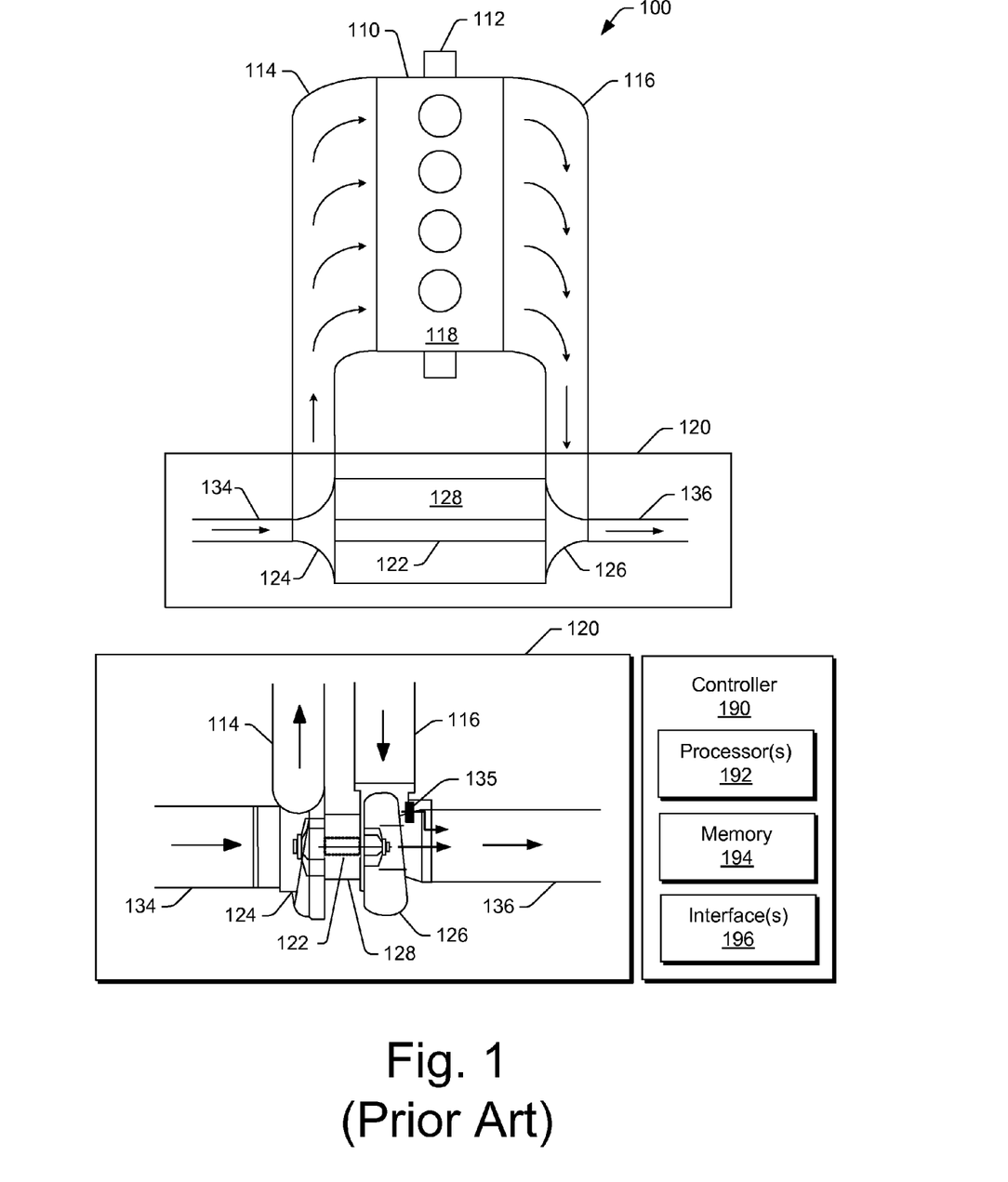
FIG. 1 is a diagram of a turbocharger and an internal combustion engine along with a controller.

Turbochargers are frequently utilized to increase output of an internal combustion engine. Referring to FIG. 1, a prior art system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components. In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126.

In FIG. 1, an example of a controller 190 is shown as including one or more processors 192, memory 194 and one or more interfaces 196. Such a controller may include circuitry such as circuitry of an engine control unit. Such a controller may include circuitry that provides for reading, writing or reading and writing information (e.g., executable instructions, control instructions, data, etc.) to memory (e.g., a computer-readable storage medium). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc.

Figure 2:
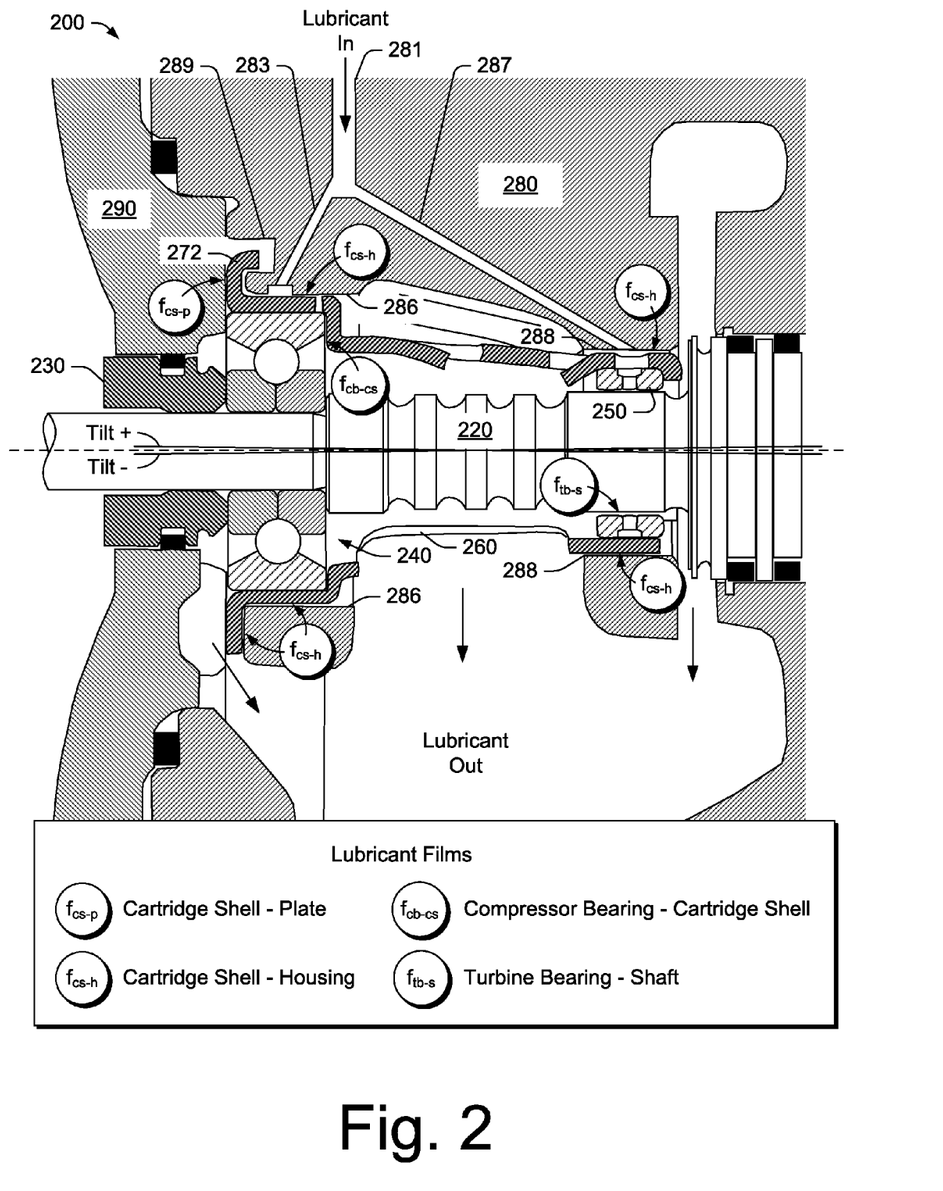
FIG. 2 is a cross-sectional view of an example of an assembly that includes a bearing cartridge.

FIG. 2 shows an example of a turbocharger assembly 200 that includes a shaft 220 supported by a compressor side bearing 240 and a turbine side bearing 250 that are located by a shell 260. Collectively, the shell 260 and the bearings 240 and 250 may be referred to as a turbocharger bearing cartridge. In the example of FIG. 2, the shell 260 is positioned in a bore of a housing 280 where a compressor plate 290 acts to axially locate the shell 260 in the bore. As shown, a thrust collar 230 is rotatably disposed in a bore of the compressor plate 290, which, as described herein, may optionally be part of the bearing 240 (see, e.g., collar 235 of FIG. 5).

A lubricant inlet 281 provides for flow of lubricant into the housing 280 where passages 283 and 287 direct lubricant to annular bore surfaces 286 and 288. While two passages are shown, the housing 280 may include one or more additional passages or, for example, another arrangement of features to direct lubricant to a turbine side bearing and a compressor side bearing.

As shown in the example of FIG. 2, various lubricant films may form, including films between the cartridge shell 260 and the plate 290 ($f_{cs-p}$), between the cartridge shell 260 and the housing 280 ($f_{cs-h}$), between the compressor bearing 240 and the cartridge shell 260 ($f_{cb-cs}$), and between the turbine bearing 250 and the shaft 220 ($f_{ts-s}$). Given the various shell-housing films, the shell 260 can "float" in the bore of the housing 280 (e.g., provided sufficient lubricant and pressure). Floating can help damp vibration, flow of lubricant, cooling, etc. As described herein, clearances between the shell 260 and the bore of the housing 280 can allow for some small amount of tilt, indicated by a "tilt +" and a "tilt −". Further, clearance between the turbine bearing 250 and the shaft 220 may also allow for some axial tilt. In general, however, as the compressor side bearing 240 is fit radially in the shell 260 (e.g., press-fit), tilting of the compressor side bearing 240 is minimized.

As described herein, during operation, lubricant may be provided from a pump such as an engine oil pump. After operation ceases or where pumping ceases, lubricant may drain from a housing (e.g., due to gravity), which may result in film thinning and possibly one or more points of contact between a shell and a housing. Upon return to operation, lubricant flow to the housing aims to support various films that allow for a return to a float state of the shell in the housing.

In the example of FIG. 2, the shell 260 further includes a prong 272 received by an opening 289 in the housing 280. The prong 272, as received by the opening 289, limits or prevents rotation of the shell 260 in the bore of the housing 280. Such an arrangement can ensure that lubricant openings of the shell 260 align properly with lubricant passages, etc., to provide for proper flow of lubricant for purposes of lubrication, floating, cooling, damping, or any combination thereof.

Figure 3:
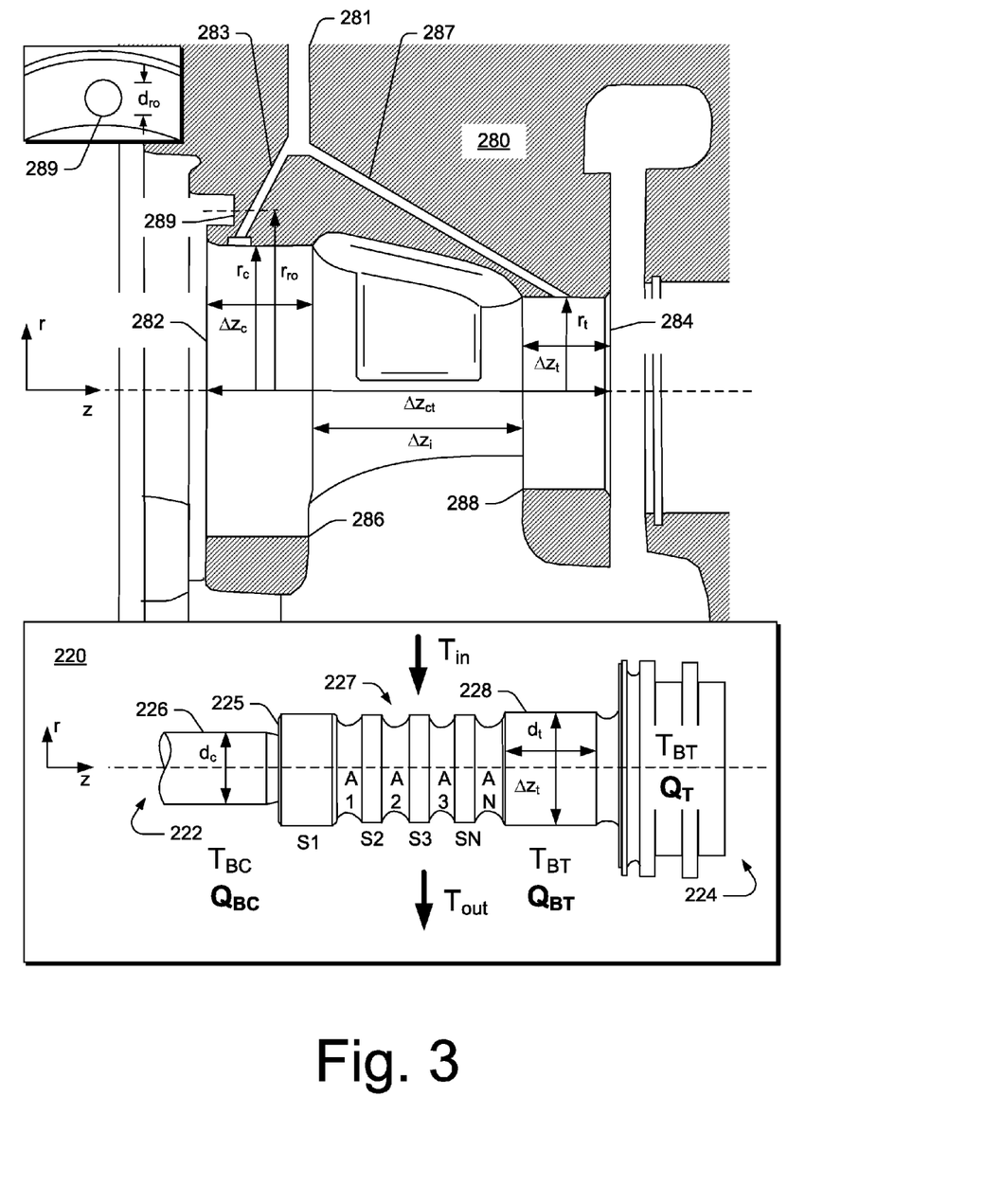
FIG. 3 is a cross-sectional view of an example of a housing and a side view of an example of a shaft that may be accommodated by the housing.

FIG. 3 shows the housing 280 and the shaft 220, with respect to an axial coordinate (z) and a radial coordinate (r). In general, upon assembly, a central axis of the shaft 220 aligns substantially with a central axis of the bore of the housing 280, for example, extending between a compressor end 282 and a turbine end 284 and as defined by annular surfaces 286 and 288. As shown, the annular surface 286 is disposed at a radius $r_c$ with an axial width $\Delta z_c$ and the annular surface 288 is disposed at a radius $r_t$ with an axial width $\Delta z_t$. The bore of the housing 280 has an axial width $\Delta z_{ct}$ between the compressor end 282 and the turbine end 284 and an intermediate width $\Delta z_i$ between the surfaces 286 and 288. The opening 289 may be defined by one or more dimensions. As an example, a partial bore (e.g., cylindrical in shape) may be defined by a diameter $d_{ro}$ at a given angle about the z-axis and at a radius $r_{ro}$ measured from the z-axis (e.g., with a depth $\Delta z_{ro}$ along the z-axis). As another example, an opening configured to receive and restrict a prong or other anti-rotation feature may be defined by a width (e.g., $\Delta r_{ro}$), depth and an arc length dimension about an azimuthal coordinate (e.g., measured in degrees about the central axis of the bore).

In the example of FIG. 3, the shaft 220 includes a compressor end 222 and a turbine end 224 with a compressor side bearing surface 226 and a turbine side bearing surface 228 disposed therebetween. Each of the bearing surfaces 226 and 228 may be defined by a respective diameter (e.g., $d_c$ and $d_t$) and a respective axial length (e.g., $\Delta z_c$ and $\Delta z_t$). An axial face 225 may mark a change in shaft diameter, for example, to position a race of a compressor side bearing (see, e.g., the bearing 240 of FIG. 2). Consider press-fitting an inner race of a ball bearing onto the compressor side bearing surface 226 of the shaft 220 where the inner race abuts the axial face 225 (e.g., at a shoulder formed in part by the axial face 225).

As described herein, a shaft may include fins or other features to increase heat transfer from the shaft to lubricant. For example, the shaft 220 includes a series of features 227 that provide additional heat transfer area A1, A2, A3 and AN adjacent respective surfaces S1, S2, S3 and SN. The heat transfer areas may be readily formed by machining a rotating shaft and may be formed with curvature to promote lubricant flow, for example, as slow flowing or stationary lubricant may lead to coke formation (e.g., via reactions favored by elevated temperature over time).

FIG. 3 further shows various temperatures and heat generation terms with respect to the shaft 220. Sources of heat include the compressor side bearing ($Q_{BC}$), the turbine side bearing ($Q_{BT}$) and the exhaust turbine end of the shaft ($Q_T$). During operation, bearing power losses (e.g., friction) generate heat that can heat a shaft while exhaust heats an exhaust turbine, which, in turn, can heat the shaft. In general, exhaust provides more heat than that generated by normally operating bearings. Lubricant flow is important to cool a shaft and bearings. The difference between lubricant inlet temperature $T_{in}$ and outlet temperature $T_{out}$ is indicative of ability to transfer generated bearing heat and exhaust heat to lubricant. Again, as mentioned, shaft features (e.g., the features 227) may be provided to enhance such heat transfer. As described herein, enhanced shaft cooling can act to reduce bearing temperature, which, in turn, can improve performance, prolong bearing life, etc. (e.g., via improved lubricant dynamics, reduced coking, etc.).

Figure 4:
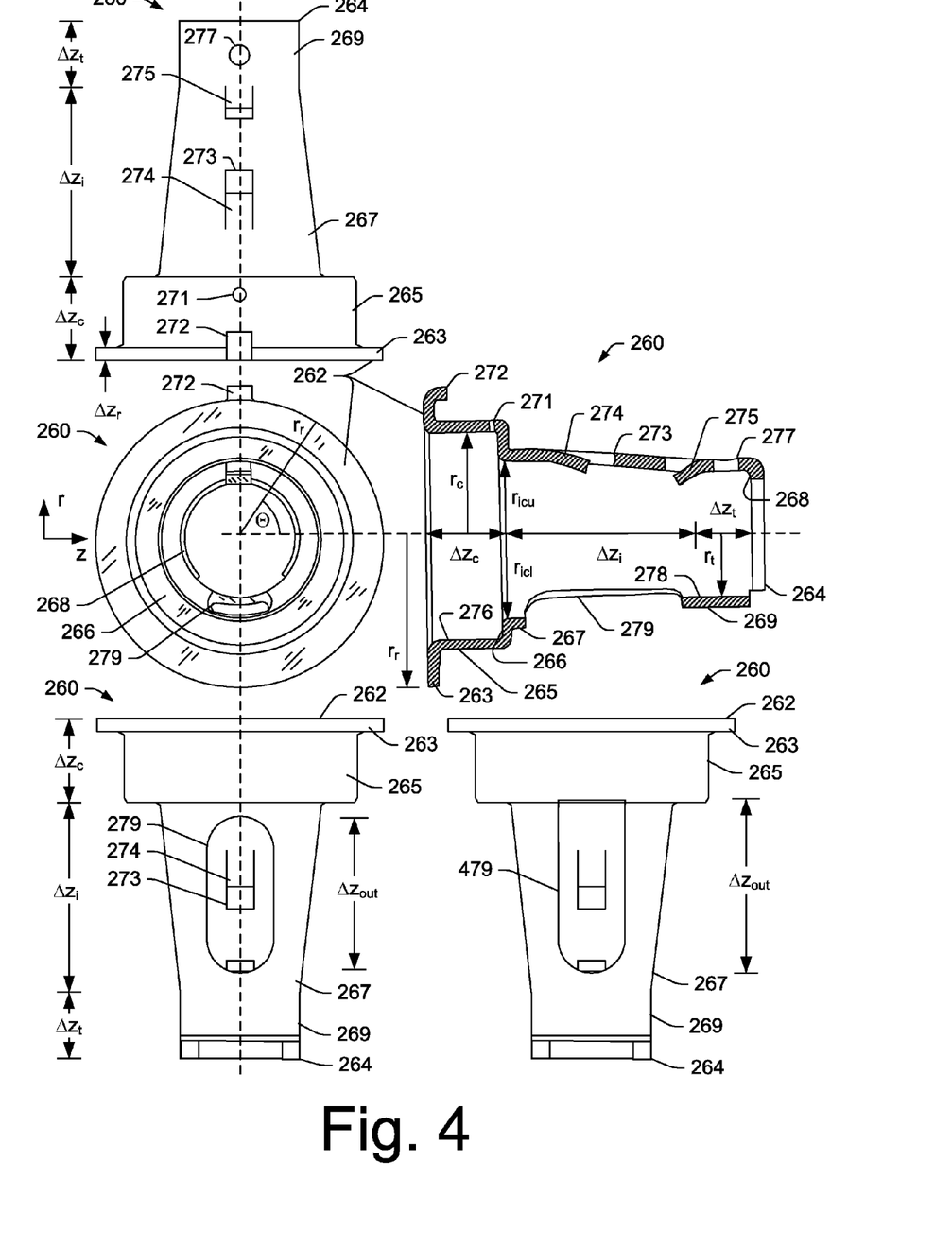
FIG. 4 is a series of views including an end view, top and bottom views and a cross-sectional view of an example of a shell configured to seat two bearings along with a bottom view of an example of an alternative shell configuration.

FIG. 4 shows various views of the shell 260 of FIG. 2 with respect to a cylindrical (r, z, $\Theta$) coordinate system. As described herein, a shell may be oriented with respect to gravity, for example, to provide for gravity induced flow of lubricant (e.g., from top to bottom openings). Similarly, a housing or housing bore may be oriented with respect to gravity as well.

In the example of FIG. 4, the shell 260 includes a compressor end 262, a rim 263, a turbine end 264, an exterior surface 265, an interior axial face 266, an exterior surface 267, an interior axial face 268, an exterior surface 269, a lubricant opening 271, an anti-rotation feature 272, a lubricant opening 273, a deformable or depressible tab 274, a deformable or depressible tab 275, an interior annular surface 276, a lubricant opening 277, an interior annular surface 278 and a lubricant outlet 279 and an example of an alternative lubricant outlet 479. Depending on function or need, a tab may optionally be removable (e.g., via cutting, deformation that leads to detachment, etc.).

In FIG. 4, various axial dimensions are shown, which include an axial length $\Delta z_c$ for the compressor side interior annular surface 276, an axial length $\Delta z_t$ for the turbine side interior annular surface 278, an axial intermediate length $\Delta z_i$ between the two annular surfaces 276 and 278, an axial length or thickness $\Delta z_r$ of the rim 263, and an axial lubricant outlet length $\Delta z_{out}$ for the lubricant outlet 279 and the alternative 479. Various radial dimensions are also shown, including a radius $r_r$ of the rim 263, a radius $r_c$ of the compressor side interior annular surface 276, an upper radius $r_{icu}$ of the axial face 266, a lower radius $r_{icl}$ of the axial face 266, and a radius $r_t$ of the turbine side interior annular surface 278.

As shown in FIG. 4, the shell 260 is composed of a rim 263 at the compressor end 262, a substantially cylindrical portion defined by the exterior surface 265 having a radius less than the rim 263, a tapering portion defined by the exterior surface 267 that tapers to a substantially cylindrical portion defined by the exterior surface 269 that terminates at the turbine end 264, which includes a rolled edge that forms the interior axial face 268.

As described herein, dimensions of various exterior surfaces of the shell 260 and of various surfaces of the housing 280 provide clearances for formation of lubricant films. For example, the surface 265 of the shell 260 and the surface 286 of the housing 280 can be dimensioned to provide for formation of a lubricant film, which may act to damp vibrations experienced during operation of a turbocharger. As another example, the surface 269 of the shell 260 and the surface 288 of the housing 280 can be dimensioned to provide for formation of a lubricant film, which may act to damp vibrations experienced during operation of a turbocharger.

Other surfaces may provide for film formation, which may depend on axial clearances. For example, surfaces of the rim 263 may allow for film formation between the rim 263 and the housing 280 and between the rim 263 and the plate 290. Such films may act to absorb axial thrust forces experienced during operation of a turbocharger (e.g., to reduce part-to-part contact and wear).

Accordingly, as described herein, a shell can provide radial surfaces for film formation and axial surfaces for film formation where such films can damp vibration, absorb thrust force, reduce wear, etc.

Referring to the alternative lubricant outlet 479 of FIG. 4, by extending it to the interior annular surface 276, lubricant may more readily drain from the shell 260, compared to the lubricant outlet 279 as the shoulder formed by stepping from the radius $r_c$ to $r_{icl}$ may act to retain some lubricant. The alternative outlet 479 is provided as an example, as other arrangement may include one or more openings located along the step, etc.

Figure 5:
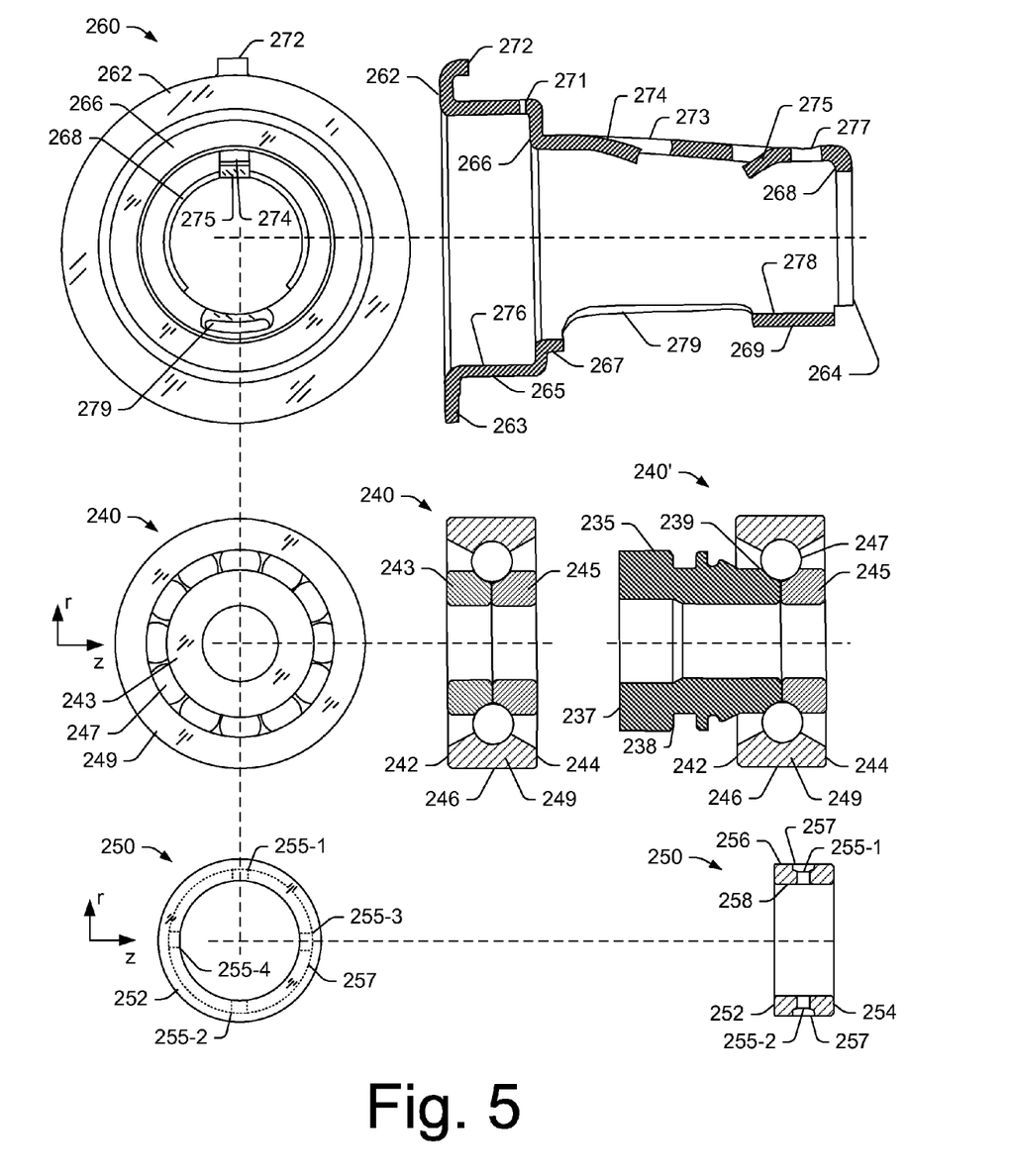
FIG. 5 is a series of views including end views and cross-sectional views of examples of a shell, a rolling element bearing and a journal bearing.

FIG. 5 shows various views of the shell 260 and bearings 240 and 250 of FIG. 2. In the cross-sectional views, the bearings 240 and 250 are shown as axially aligned with the shell 260, but for an alternative example of the bearing 240 that includes an inner race with a thrust collar 235.

In the example of FIG. 5, the bearing 240 includes an inner race 243, an inner race 245, rolling elements 247 and an outer race 249. The bearing 240 has axial faces 242 and 244 as well as a radial surface 246. The bearing 240 may be symmetric or asymmetric; noting that a symmetric bearing can facilitate assembly (e.g., by providing two possible orientations). The alternative example of the bearing 240 (see the bearing 240') with the thrust collar 235 is asymmetric, yet, depending on dimensions, may be capable of only one orientation upon assembly. As shown in the example of FIG. 5, the thrust collar 235 includes an axial thrust face 237 at one end and a seat 239 at an opposite end, which cooperates with the inner race 245 for seating rolling elements (see, e.g., rolling element 247), as well as an annular groove 238 for seating a seal element (e.g., a ring). In such an example, the components 235 and 245 may be press-fit to a shaft and, during operation, rotate with the shaft. As a thrust collar serves as an inner race, such an approach can reduce number of components. While balls are shown as rolling elements 247, other types of rolling elements may be provided (e.g., cylinders, etc.).

In the example of FIG. 5, the bearing 250 includes one or more lubricant openings 255-1 and 255-2, which are aligned with an annular groove 257 and provide for flow of lubricant to an interior journal surface 258 (e.g., fed from the lubricant opening 277 of the shell 260). The bearing 250 includes two axial faces 252 and 254 as well as a radial surface 256. In a side view of the bearing 250, dashed lines illustrate various openings 255-1, 255-2, 255-3 and 255-4 and the annular groove 257. As described herein, a bearing with lubricant passages or features that differ from one or more of those of the example bearing 250 of FIG. 5 may be suitable for use with the shell 260.

Assembly of a bearing cartridge includes locating the bearings 240 and 250 in the shell 260. As described herein, the outer race 249 of the bearing 240 can be located radially by the interior annular surface 276 of the shell 260 and can optionally be located axially by the interior axial face 266 while the journal bearing 250 can be located radially by the interior annular surface 278 of the shell 260 and can optionally be located axially by the interior axial face 268 and optionally by deformation of the tab 275. As described herein, one or both of the bearings 240 and 250 can be located in the shell 260 in a manner that prevents rotation of the outer race 249 of the rolling element bearing 240 or rotation of the journal bearing 250. Such an approach, compared to a conventional approach, acts to transfer a lubricant squeeze film or film from bearing surfaces to shell surfaces.

Figure 6:
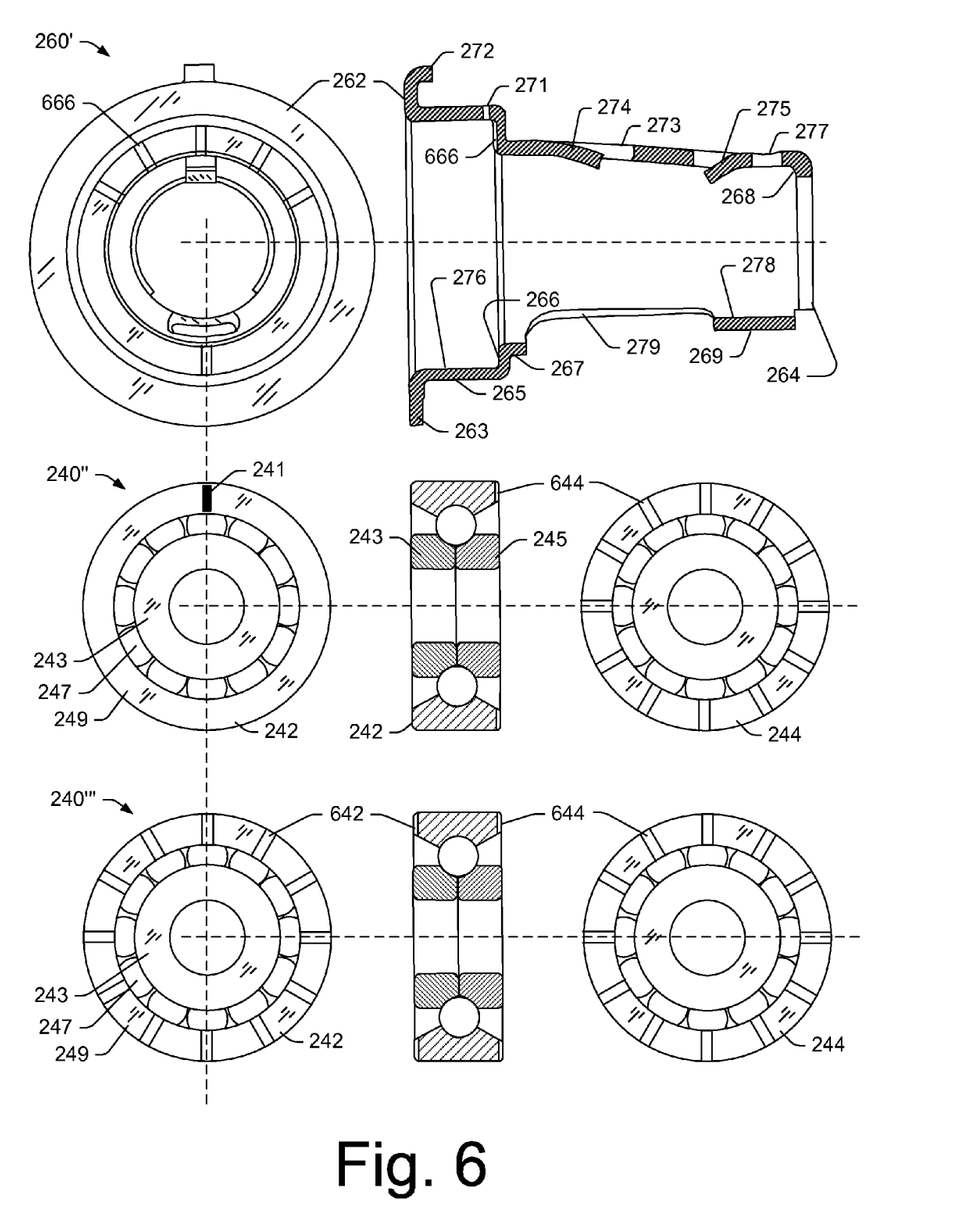
FIG. 6 is a series of views including end views and cross-sectional views of examples of a shell and rolling element bearings.

FIG. 6 shows various views of the shell 260, as the shell 260', with optional lubricant channels 666 and the bearing 240, as the bearing 240'' and the bearing 240''', with optional lubricant channels 642 and 644. An assembly may include a shell with lubricant channels, a bearing with lubricant channels or a shell with lubricant channels and a bearing with lubricant channels. As to configurations that include a shell with one or more lubricant channels and a bearing with one or more lubricant channels, alignment, where desired, may be facilitate via one or more markings on an outer race, a shell or an outer race and a shell. For example, in FIG. 6, a marking 241 appears on the face 242 of the outer race 249 of the bearing 240'', which may be for alignment with the anti-rotation feature 272 of the shell 260. As described herein, degree of alignment (or misalignment) of passages (e.g., channels) may determine, at least in part, lubricant flow dynamics from an opening in a shell (e.g., the opening 271) and between a face of an outer race (e.g., the face 244) that abuts a face of the shell (e.g., the face 266).

As shown, the lubricant channels 666 exist over an arc portion of the axial face 266 of the shell 260'. Such channels allow for flow of lubricant from the opening 271 to the rolling elements 247 of the bearing 240. Additionally or alternatively, the outer race 249 of the bearing 240 may include lubricant channels (see, e.g., the bearing 240'' and the bearing 240'''). As shown, the outer race 249 may include lubricant channels 644 on one axial face 244 (e.g., as an asymmetric bearing) or may include lubricant channels 642 and 644 on both axial faces 242 and 244 (e.g., as a symmetric bearing). In general, the channels 642 or 644 are located adjacent the axial face 266 of the shell 260, which may also include one or more channels 666, per the shell 260'.

As an alternative, a spacing mechanism may be provided to maintain a space between the outer race 249 of the bearing 240 and the axial face 266 of the shell 260 where such a space allows for flow of lubricant to rolling elements 247 of the bearing 240. As described herein, in the examples of FIG. 6, the inner race 243 may optionally include a thrust collar (see, e.g., the thrust collar 235 of FIG. 5).

Figure 7:
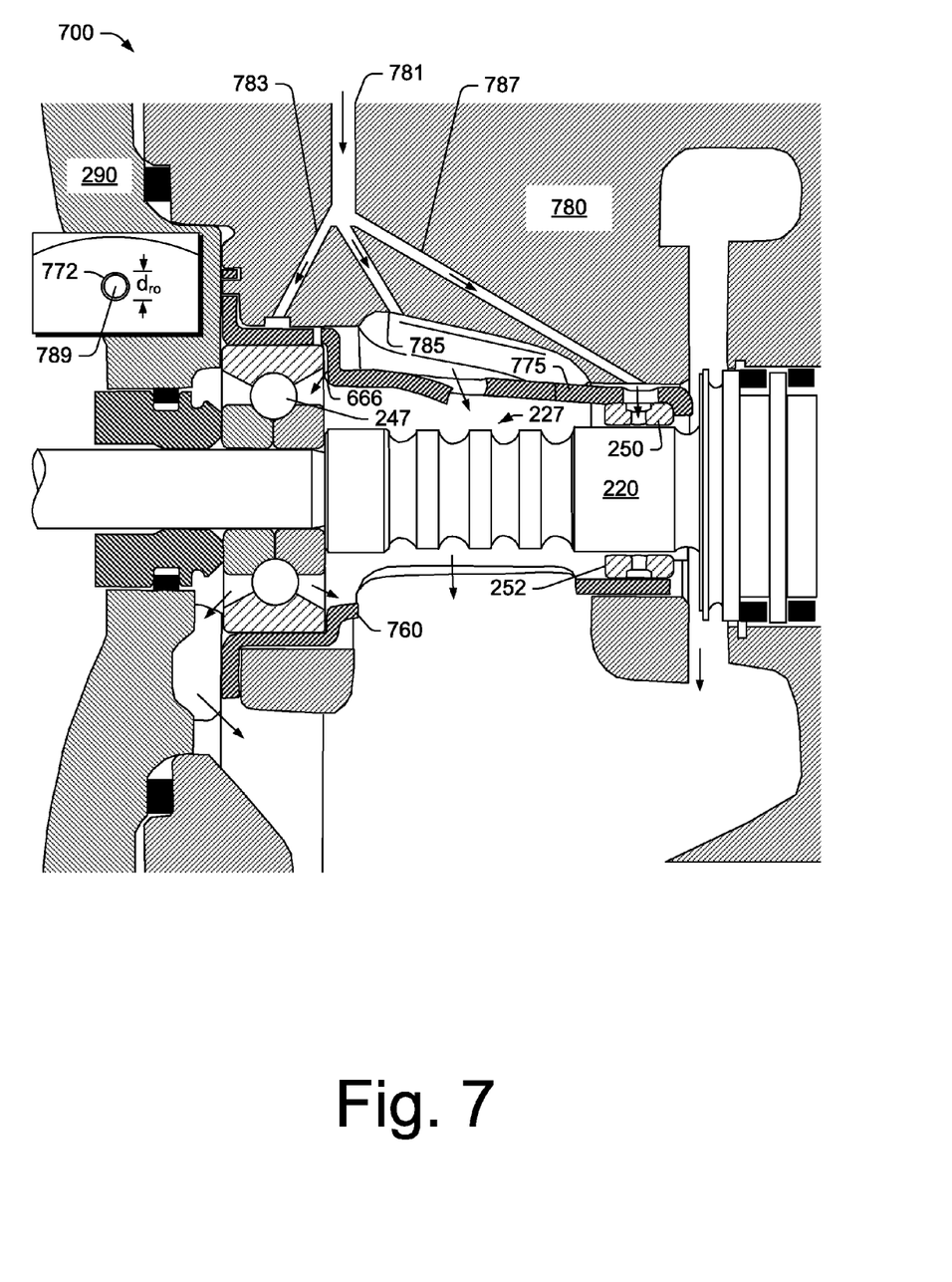
FIG. 7 is a cross-sectional view of an example of an assembly that includes a bearing cartridge.

FIG. 7 shows an example of an assembly 700 that includes a bearing cartridge. The assembly 700 includes a housing 780 with a lubricant inlet 781 in fluid communication with lubricant passages 783, 785 and 787. As mentioned, a jet may be provided to direct lubricant to a portion of a shaft. As shown in the example of FIG. 7, the passage 785 can direct lubricant to a finned portion 227 of the shaft 220.

The example of FIG. 7 also shows a shell 760 as including at least one channel 666 for flow of lubricant to rolling elements 247. Further, a deformable or depressible tab 775 is shown in an undepressed position, as the journal bearing 250 may be press-fit or otherwise not require axial location along its compressor facing face 252.

As for anti-rotation features to limit rotation of the shell 760 in the housing 780, the shell 780 includes an opening 772 configured to receive a post 789 extending axially outward from an axial face of the housing 780. In another alternative, openings may exist in both the shell and the housing where, for example, a plate (e.g., the plate 290) includes a post that acts to limit rotation of the shell in the housing upon receipt of the post by both openings. While some examples are given, various other types of anti-rotation mechanisms may be implemented.

Figure 8:
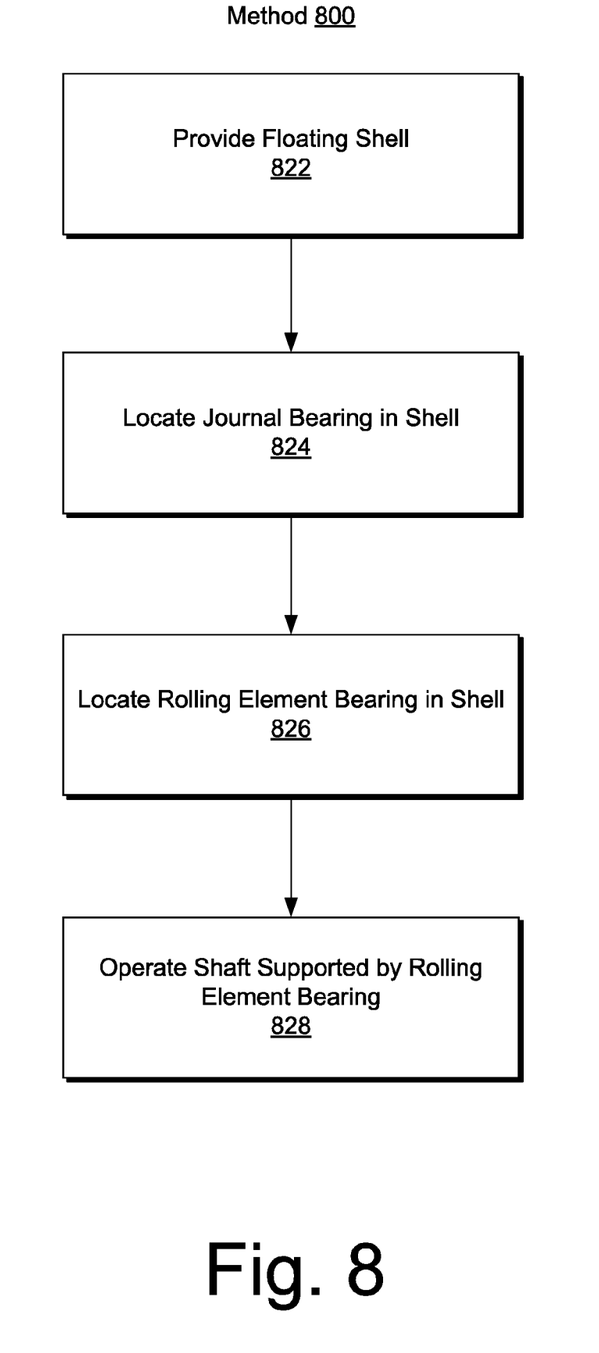
FIG. 8 is a block diagram of an example of a method that includes operating a shaft supported by a rolling element bearing disposed in a floating shell.

FIG. 8 shows an example of a method 800. The method 800 includes a provision block 822 for providing a floating shell (e.g., configured to float in a bore of a housing), a location block 824 for locating a journal bearing in the shell, a location block 826 for locating a rolling element bearing in the shell and an operation block 828 for operating a shaft supported by the rolling element bearing. Such a method can further include deforming or depressing a tab of the shell to locate the journal bearing in the shell. Further, during operation, a method can include providing lubricant, forming one or more films between a housing and a shell and floating the shell in the housing while also providing lubricant to a rolling element bearing and a journal bearing. Such a method can further include directing lubricant to a portion of a rotating shaft where that portion may include features to enhance heat transfer (e.g., fins, surfaces with varying diameter over axial distance, etc.).

As described herein, a turbocharger bearing cartridge can include a bearing with an inner race (optionally a multi-piece inner race), an outer race and rolling elements disposed between the inner race and the outer race; a journal bearing (optionally a unitary piece); and a shell that includes an interior, compressor side annular surface configured to seat the outer race of the bearing and an interior, turbine side annular surface configured to seat the journal bearing. Such a cartridge can include an anti-rotation feature to limit rotation of the shell in a bore of a housing of a turbocharger.

As described herein, a shell can include a compressor side rim. For example, such a rim may be configured to axially locate the shell in a bore of a housing of a turbocharger. At a turbine end, a shell may include a rolled edge. Such an edge may be configured to axially locate a journal bearing or, depending on requirements (e.g., performance, cost, etc.), optionally another type of bearing or a portion thereof (e.g., an outer race of a rolling element bearing).

As described with respect to various examples, a shell can include an axial face disposed adjacent an interior, compressor side annular surface where, for example, the axial face is configured to locate an outer race of a bearing. Such an axial face may include at least one lubricant channel configured to provide for flow of lubricant to rolling elements of the bearing. As mentioned, an outer race of a bearing can include at least one lubricant channel configured to provide for flow of lubricant to rolling elements of the bearing.

As described herein, a shell may include at least one deformable or depressible tab. For example, a deformable tab may be a journal bearing locating tab. As another example, a deformable tab may be a lubricant inlet tab. As to lubricant flow, a shell can include a lubricant outlet disposed between an interior, compressor side annular surface and an interior, turbine side annular surface.

As to a rolling element bearing, such a bearing may include an inner race with a thrust collar, configured to extend axially outwardly away from the shell. Such an inner race may be composed of two pieces, a unitary inner race-thrust collar piece and another unitary inner race piece. In general, for assembly of a rolling element bearing, the outer race or the inner race is typically formed from two or more pieces (e.g., a process that includes providing race(s), positioning rolling elements, encapsulating elements).

As described herein, a turbocharger bearing cartridge can optionally accommodate a shaft that includes a surface to cooperate with an inner race of a rolling element bearing, a surface to cooperate with a journal bearing and heat transfer surfaces, each surface of varying diameter, located therebetween. As to lubricant flow, a bearing cartridge can include an interior, compressor side annular surface with a lubricant opening and an interior, turbine side annular surface with a lubricant opening.

As described herein, a turbocharger assembly can include a shell configured to seat a compressor side rolling element bearing and a turbine side journal bearing where the shell includes a compressor side rim and an anti-rotation feature; and a housing that includes a bore configured to receive the shell, an axial face configured to seat the rim of the shell to axially locate the shell in the bore, and an anti-rotation feature configured to cooperate with the anti-rotation feature of the shell to limit rotation of the shell in the bore. In such an example, clearances between the shell and the housing can provide for formation of lubricant films to float the shell in the housing.

As described herein, a turbocharger assembly can include a bearing cartridge that includes a rimmed shell seating a compressor side rolling element bearing and a turbine side journal bearing; a housing that includes an axial face and a bore configured to, respectively, axially located and receive the rimmed shell; and a shaft rotatably supported by the rolling element bearing where the shaft includes a finned portion for enhanced heat transfer.

As described herein, various acts may be performed by a controller (see, e.g., the controller 190 of FIG. 1), which may be a programmable control configured to operate according to instructions. As described herein, one or more computer-readable media may include processor-executable instructions to instruct a computer (e.g., controller or other computing device) to perform one or more acts described herein. A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. A turbocharger bearing cartridge comprising:
a bearing that comprises an inner race, an outer race and rolling elements disposed between the inner race and the outer race;
a journal bearing; and
a shell that comprises an interior, compressor side annular surface configured to seat the outer race of the bearing and an interior, turbine side annular surface configured to seat the journal bearing wherein the shell comprises at least one deformable tab and wherein the at least one deformable tab comprises a journal bearing locating tab configured to axially locate the journal bearing.

2. The turbocharger bearing cartridge of claim 1 further comprising an anti-rotation feature to limit rotation of the shell in a bore of a housing of a turbocharger.

3. The turbocharger bearing cartridge of claim 1 wherein the shell comprises a compressor side rim.

4. The turbocharger bearing cartridge of claim 3 wherein the compressor side rim is configured to axially locate the shell in a bore of a housing of a turbocharger.

5. The turbocharger bearing cartridge of claim 1 wherein the shell comprises a rolled turbine side edge.

6. The turbocharger bearing cartridge of claim 5 wherein the rolled turbine side edge is configured to axially locate the journal bearing.

7. The turbocharger bearing cartridge of claim 1 wherein the shell comprises an axial face disposed adjacent the interior, compressor side annular surface.

8. The turbocharger bearing cartridge of claim 7 wherein the axial face is configured to locate the outer race of the bearing.

9. The turbocharger bearing cartridge of claim 7 wherein the axial face comprises at least one lubricant channel configured to provide for flow of lubricant to the rolling elements of the bearing.

10. The turbocharger bearing cartridge of claim 1 wherein the outer race of the bearing comprises at least one lubricant channel configured to provide for flow of lubricant to the rolling elements of the bearing.

11. The turbocharger bearing cartridge of claim 1 wherein the shell comprises at least two deformable tabs.

12. The turbocharger bearing cartridge of claim 11 wherein the at least two deformable tabs comprise a lubricant inlet tab.

13. The turbocharger bearing cartridge of claim 1 wherein the shell comprises a lubricant outlet disposed between the interior, compressor side annular surface and the interior, turbine side annular surface.

14. The turbocharger bearing cartridge of claim 1 wherein the inner race of the bearing comprises a thrust collar that extends axially outwardly away from the shell.

15. The turbocharger bearing cartridge of claim 1 further comprising a shaft that comprises a surface to cooperate with the inner race of the bearing, a surface to cooperate with the journal bearing and heat transfer surfaces, each surface of varying diameter, located therebetween.

16. The turbocharger bearing cartridge of claim 1 wherein the interior, compressor side annular surface comprises a lubricant opening and wherein the interior, turbine side annular surface comprises a lubricant opening.

17. The turbocharger bearing cartridge of claim 1 wherein the outer race comprises an outer surface disposed at a radius defined about a central axis of the outer race and wherein the journal bearing comprises an outer surface disposed at a radius about a central axis of the journal bearing and wherein the radius of the outer surface of the outer race exceeds the radius of the outer surface of the journal bearing.

18. The turbocharger bearing cartridge of claim 17 wherein the interior, compressor side annular surface of the shell seats the outer surface of the outer race and wherein the interior, turbine side annular surface of the shell seats the outer surface of the journal bearing.

19. A turbocharger assembly comprising:
   a bearing that comprises an inner race, an outer race and rolling elements disposed between the inner race and the outer race wherein the outer race comprises an outer surface disposed at a radius defined about a central axis of the outer race;
   a journal bearing that comprises an outer surface disposed at a radius about a central axis of the journal bearing wherein the radius of the outer surface of the outer race exceeds the radius of the outer surface of the journal bearing;
   a shell that comprises an interior, compressor side annular surface that seats the outer race of the bearing along the outer surface of the outer race and an interior, turbine side annular surface that seats the journal bearing along the outer surface of the journal bearing wherein the shell comprises at least one deformable tab and wherein the at least one deformable tab comprises a journal bearing locating tab configured to axially locate the journal bearing; and
   a housing that comprises an axial face and a bore that, respectively, axially locate and receive the shell.

20. A turbocharger bearing cartridge comprising:
   a bearing that comprises an inner race, an outer race and rolling elements disposed between the inner race and the outer race;
   a journal bearing; and
   a shell that comprises an interior, compressor side annular surface configured to seat the outer race of the bearing and an interior, turbine side annular surface configured to seat the journal bearing wherein the shell comprises at least one deformable tab and wherein the at least one deformable tab comprises a lubricant inlet tab.

* * * * *